(12) United States Patent
Miller

(10) Patent No.: US 8,709,107 B2
(45) Date of Patent: Apr. 29, 2014

(54) BIODIESELS USEFUL FOR IMPROVING CLOUD POINT

(75) Inventor: Stephen J. Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 515 days.

(21) Appl. No.: 12/751,337

(22) Filed: Mar. 31, 2010

(65) Prior Publication Data

US 2011/0239529 A1 Oct. 6, 2011

(51) Int. Cl.
| | |
|---|---|
| *C10L 1/02* | (2006.01) |
| *C10L 1/18* | (2006.01) |
| *C10L 1/188* | (2006.01) |
| *C10L 1/19* | (2006.01) |
| *C10G 45/02* | (2006.01) |
| *C11C 3/00* | (2006.01) |

(52) U.S. Cl.
CPC ............. *C10L 1/19* (2013.01); *C10G 2300/304* (2013.01); *C10G 45/02* (2013.01); *Y02E 50/13* (2013.01); *C11C 3/003* (2013.01); *C10G 2300/1014* (2013.01)
USPC ................................. 44/307; 44/385; 44/388

(58) Field of Classification Search
USPC ........................................... 44/385, 307, 388
See application file for complete search history.

(56) References Cited

U.S. PATENT DOCUMENTS

| | | | |
|---|---|---|---|
| 6,712,867 | B1 | 3/2004 | Boocock |
| 6,818,026 | B2 | 11/2004 | Tateno et al. |

| | | | |
|---|---|---|---|
| 2007/0282118 | A1 | 12/2007 | Gupta et al. |
| 2011/0023352 | A1* | 2/2011 | Knuth et al. ..................... 44/385 |
| 2011/0232159 | A1* | 9/2011 | Westlake et al. ................ 44/307 |

FOREIGN PATENT DOCUMENTS

WO WO2009039151 * 3/2009

OTHER PUBLICATIONS

Wang, "The production of isopropyl esters and their effect on a diesel engine", Thesis, Iowa State University (2003).
Wu et al., "Low-Temperature Property and Engine Performance Evaluation of Ethyl and Isopropyl Esters of Tallow and Grease", 75(9) JAOCS (1998), pp. 1173-1178.
Lee et al., "Use of Branched-Chain Esters to Reduce the Crystallization Temperature of Biodiesel", 72(10) JAOCS (1995), pp. 1155-1160.
Wang et al., "The Production of Fatty Acid Isopropyl Esters and Their Use as a Diesel Engine Fuel", 82(11) JAOCS (2005), pp. 845-849.
Demirbas, Ayhan, "Progress and Recent Trends in Biodiesel Fuels", Energy Conversion and Management 50 (2009), pp. 14-34.
Issariyakul et al., "Production of Biodiesel From Waste Fryer Grease Using Mixed Methanol/Ethanol System", University of Saskatchewan (2006), pp. 1-8.
Knothe, Gerhard, "Dependence of Biodiesel Fuel Properties on the Structure of Fatty Acid Alkyl Esters", Fuel Processing Technology 86 (2005), pp. 1059-1070.
Lang et al., "Preparation and Characterization of BioDiesels from Various Bio-Oils", Bioresource Technology 80 (2001), pp. 53-62.

* cited by examiner

*Primary Examiner* — Prem C Singh
*Assistant Examiner* — Chantel Graham

(57) ABSTRACT

The instant invention pertains to new biodiesels which may be blended with petrodiesel. The biodiesels may comprise a fatty acid $C_1$-$C_2$ alkyl ester and a fatty acid branched $C_3$-$C_4$ alkyl ester. Blends of the novel biodiesel and petrodiesel often exhibit advantageous cloud point properties.

17 Claims, 4 Drawing Sheets

BIODIESELS USEFUL FOR IMPROVING CLOUD POINT

FIELD OF THE INVENTION

The instant invention relates to biodiesels useful for improving cloud point properties wherein the biodiesels comprise a fatty acid $C_1$-$C_2$ alkyl ester and a fatty acid branched $C_3$-$C_4$ alkyl ester.

BACKGROUND AND SUMMARY OF THE INVENTION

Alternative fuels are becoming increasingly more attractive for a number of reasons including reducing foreign oil dependence, environmental and emission concerns, and government mandates. Biodiesel is one alternative fuel that is gathering increasing attention because it may be made from a sustainable source. That is, biodiesel is commonly made by transesterifying an oil such as vegetable oil with, for example, methanol to obtain a fatty acid methyl ester also called FAME. Typically, biodiesels like FAME are blended with a petroleum-derived diesel, i.e., petrodiesel, in various amounts. For example, A B5 blend is typically 5% biodiesel by volume in petrodiesel, a B10 blend is typically 10% biodiesel by volume in petrodiesel, a B20 blend is typically 20% biodiesel, etc.

Unfortunately, blending FAME with petrodiesel often increases the cloud point, i.e., the temperature at which a cloud of crystals first appears under standard cooling conditions. The amount of the cloud point increase usually goes up as the volume of FAME goes up. This is problematic in that there are often rigorous cloud point specifications in order that the fuel functions properly in the engine even in cold weather.

It has been suggested that FAME could be eliminated and fatty acid isopropyl esters (FAIE) substituted for FAME in a petrodiesel blend. For example, Wang suggests that "for better cold weather performance, isopropyl esters look very promising as a neat blend." See, P. Wang, "The production of isopropyl esters and their effects on a diesel engine," M. S. Thesis, Iowa State University, 2003 at p. 4. See also, W. H. Wu, T. A. Foglia, W. N. Manner, R. O. Dunn, C. E. Goering, and T. E. Briggs, JAOCS, 75, 1173 (1998); I. Lee, L. A. Johnson, and E. G. Hammond, ibid., 72, 1155 (1995); and P. Wang, M. Tat, and J. Van Gerpen, ibid., 82, 845 (2005). Unfortunately, FAIE is generally more costly to produce than FAME due to, for example, the cost of isopropanol. Therefore, there is a high cost to eliminate FAME—especially when it can be as much as from about 5 to about 20% by volume of the biodiesel:petrodiesel blend.

Accordingly, what is needed are cost-effective biodiesel compositions that will not negatively affect cloud point properties over a range of various petrodiesel blend compositions. Advantageously, the instant invention offers cost-effective biodiesel compositions which yield improved cloud point properties when blended over a range of various petrodiesel blend compositions.

In one embodiment the invention pertains to a biodiesel composition comprising at least about 50 percent by volume fatty acid methyl ester. The biodiesel composition also comprises an amount of fatty acid branched $C_3$-$C_4$ alkyl ester sufficient to reduce the cloud point of a 10:90 liquid volume composition of a biodiesel:petrodiesel blend to at least ⅔ of the total cloud point reduction as measured in degrees Celsius of a 10:90 liquid volume composition of a fatty acid branched $C_3$-$C_4$ alkyl ester:petrodiesel blend.

In another embodiment the invention pertains to a composition comprising petrodiesel and from about 4 to about 22 volume percent biodiesel based on the total volume of the composition. The biodiesel comprises fatty acid branched $C_3$-$C_4$ alkyl ester and fatty acid methyl ester. The fatty acid branched $C_3$-$C_4$ alkyl ester comprises from about 10 to about 50 volume percent of the biodiesel based on the total volume of biodiesel.

In another embodiment the invention pertains to a composition comprising bodiesel and petrodiesel. The petrodiesel comprises at least about 78% by volume based on the total volume of the composition. The biodiesel comprises fatty acid methyl ester and from about 5 to about 50 volume percent of fatty acid isopropyl ester based on the total volume of the biodiesel.

DETAILED DESCRIPTION OF THE INVENTION

Figure 1:
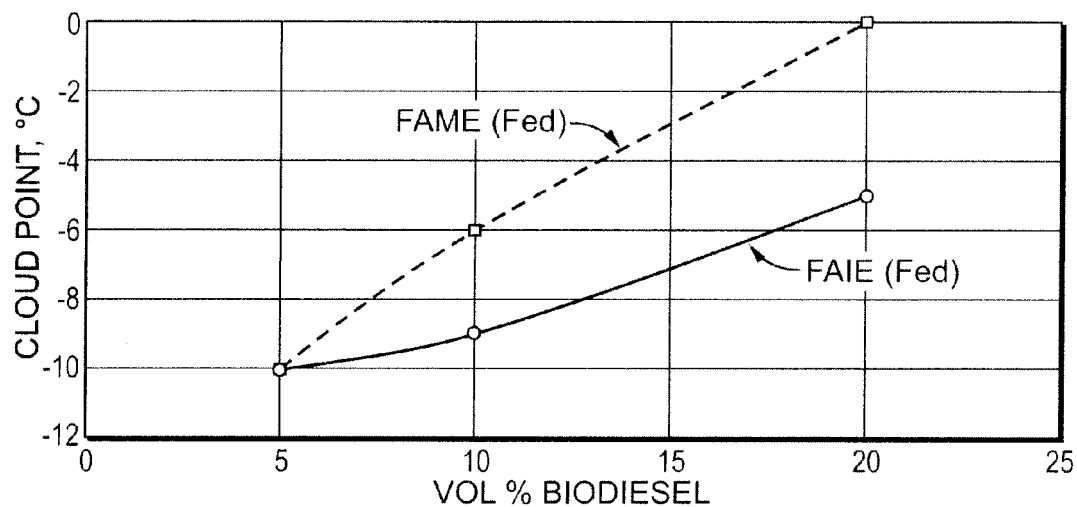
FIG. 1 shows the cloud points of various blends of biodiesel and Diesel A of the examples.

As used herein, "biodiesel" refers to a diesel fuel containing long chain aliphatic (usually alkyl) esters typically made by transesterifying a renewable source such as lipids and which typically contains little to no petroleum.

As used herein, "petrodiesel" refers to a petroleum-derived distillate fuel boiling between about 150° C. and 350° C.

As used herein, "cloud point" means cloud point as determined according to ASTM D5771.

In general terms, in one embodiment the instant invention pertains to a biodiesel composition comprising a fatty acid $C_1$-$C_2$ alkyl ester and a fatty acid branched $C_3$-$C_4$ alkyl ester. The biodiesel compositions may be employed as a fuel alone or blended with, for example, petrodiesel and various additives.

The fatty acid $C_1$-$C_2$ alkyl ester of the biodiesel may be selected from, for example, fatty acid methyl ester, fatty acid ethyl ester, or a mixture thereof. The fatty acid branched $C_3$-$C_4$ alkyl ester may be selected from, for example, fatty acid isopropyl ester, fatty acid sec-butyl ester, fatty acid tert-buty ester, or a mixture thereof. In a preferred embodiment, the fatty acid $C_1$-$C_2$ alkyl ester of the biodiesel is fatty acid methyl ester and the fatty acid branched $C_3$-$C_4$ alkyl ester of the biodiesel is fatty acid isopropyl ester.

The fatty acid portion of both the fatty acid $C_1$-$C_2$ alkyl ester and the fatty acid branched $C_3$-$C_4$ alkyl ester may be derived from any suitable fatty acid or mixture of fatty acids. Such fatty acids typically are aliphatic and comprise at least about 10 carbon atoms up to about 18, or up to about 16, or up to about 14 carbon atoms. Such fatty acids may be one or more of those derived from, for example, an oil independently selected from the group consisting of tallow, algae, a vegetable oil, and mixtures thereof. The vegetable oil may be selected from, for example, peanut, palm, soy, rapeseed, mustard, jatropha, mahua, hemp, field pennycress, pongamia pinnata, flax, camellina, sunflower, and mixtures thereof. Such fatty acid alkyl esters may be obtained from commercially available sources or may be manufactured using any convenient method such as transesterification of a suitable vegetable oil.

The amount of fatty acid $C_1$-$C_2$ alkyl ester and fatty acid branched $C_3$-$C_4$ alkyl ester in the biodiesel is not particularly critical so long as the biodiesel exhibits the desired properties. Similarly, the mixing of fatty acid $C_1$-$C_2$ alkyl ester and fatty acid branched $C_3$-$C_4$ alkyl ester may be done in any convenient manner. In one embodiment, the biodiesel comprises at least about 50 percent by volume fatty acid $C_1$-$C_2$ alkyl ester, preferably fatty acid methyl ester, based on total volume of biodiesel. The amount of fatty acid branched $C_3$-$C_4$ alkyl ester may be a cloud point reducing amount. A "cloud point reducing amount" is that amount which is sufficient to reduce the cloud point of a 10:90 liquid volume composition of a biodiesel:petrodiesel blend to at least ⅔, or at least 7/10, or at least ¾, of the total cloud point reduction as measured in degrees Celsius of a 10:90 liquid volume composition of a fatty acid branched $C_3$-$C_4$ alkyl ester:petrodiesel blend.

That is, when 10 percent by volume of the inventive biodiesel is blended with petrodiesel, the cloud point (measured according to ASTM D5771) of the blend exhibits a surprising and unexpected reduction. Even though the biodiesel component of the blend comprises at least about 50 percent by volume fatty acid $C_1$-$C_2$ alkyl ester such as FAME (based on total biodiesel volume), the cloud point of said blend may more closely resemble that of a blend comprising 10 volume percent of the same fatty acid branched $C_3$-$C_4$ alkyl ester such as fatty acid isopropyl ester (without a fatty acid $C_1$-$C_2$ alkyl ester such as FAME). That is in one embodiment when the biodiesel component of the blend comprises at least about 10% of branched C3-C4 fatty acid alkyl ester, then the cloud point of the blend is often nearly or about equal to that when the whole biodiesel component is the same C3-C4 branched fatty acid alkyl ester. Thus, one may significantly reduce the cloud point of a biodiesel:petrodiesel blend by employing a biodiesel which comprises a majority of FAME and a relatively minor amount of fatty acid branched $C_3$-$C_4$ alkyl ester such as fatty acid isopropyl ester which is usually more costly than the FAME.

As mentioned above the biodiesel usually comprises at least about 50 percent by volume fatty acid $C_1$-$C_2$ alkyl ester based on total volume of biodiesel and a cloud point reducing amount of fatty acid branched $C_3$-$C_4$ alkyl ester. The specific amount of fatty acid branched $C_3$-$C_4$ alkyl ester in the biodiesel may vary depending upon the properties desired, the specific compounds employed, as well as, whether and/or to what extent the biodiesel is to be blended with, for example, a petrodiesel. Typically, the amount of fatty acid branched $C_3$-$C_4$ alkyl ester in the biodiesel may be at least about 5, or at least about 10, or at least about 15, or least about 20 percent by volume up to at most about 50, or up to at most about 40, or up to at most about 35 percent by volume fatty acid branched $C_3$-$C_4$ alkyl ester based on the total volume of biodiesel.

The aforementioned inventive biodiesels comprising a mixture of at least about 50 volume percent of fatty acid $C_1$-$C_2$ alkyl ester and an amount of fatty acid branched $C_3$-$C_4$ alkyl ester may often reduce the cloud point of a biodiesel:petrodiesel blend by at least about 1, or at least about 2, or even at least about 3° C. or more as compared to a comparable biodiesel:petrodiesel blend. By comparable biodiesel:petrodiesel blend it is meant that the total volume ratio of biodiesel:petrodiesel is the same but the biodiesel lacks the required amount of fatty acid branched $C_3$-$C_4$ alkyl ester and is instead composed of only a fatty acid $C_1$-$C_2$ alkyl ester such as FAME. For example, a blend of 10 percent by liquid volume of an inventive biodiesel composition and 90 percent by liquid volume petrodiesel has a cloud point at least about 1, or at least about 2, or at least about 3° C. less than the cloud point of a comparable blend of 10 percent by liquid volume of a fatty acid $C_1$-$C_2$ alkyl ester and 90 percent by liquid volume petrodiesel. And in another example, a blend of 15 percent by liquid volume of an inventive biodiesel composition and 85 percent by liquid volume petrodiesel has a cloud point at least about 1, or at least about 2, or at least about 3° C. less than the cloud point of a comparable blend of 15 percent by liquid volume of a fatty acid $C_1$-$C_2$ alkyl ester and 85 percent by liquid volume petrodiesel.

A preferred petrodiesel blend composition comprises bodiesel and petrodiesel, wherein the petrodiesel comprises at least about 78% by volume on the total volume of the composition, and wherein the biodiesel comprises fatty acid methyl ester and fatty acid isopropyl ester wherein the fatty acid isopropyl ester comprises from at least about 10, or at least about 20 volume percent up to at most about 50, or up to at most about 40 volume percent based on the total volume of the biodiesel in the blend composition.

Another particularly preferred petrodiesel blend composition comprises petrodiesel and from about 4 to about 22 volume percent biodiesel based on the total volume of the composition. The biodiesel comprises fatty acid branched $C_3$-$C_4$ alkyl ester which is preferably fatty acid isopropyl ester and fatty acid methyl ester. The fatty acid branched $C_3$-$C_4$ alkyl ester comprises from about 10 to about 50, preferably from about 20 to about 40, volume percent of the biodiesel based on the total volume of biodiesel in the blend. Such a composition may exhibit a cloud point which is at least about 1, or at least about 2, or at least about 3° C. less than a comparable composition having the same volume percent biodiesel but lacks the aforementioned amount of fatty acid branched $C_3$-$C_4$ alkyl ester. Similar to that described above, "comparable composition" is meant a composition having the same volume percent biodiesel and petrodiesel but wherein an amount of fatty acid branched $C_3$-$C_4$ alkyl ester has been replaced with fatty acid methyl ester such that the biodiesel is substantially comprised of fatty acid methyl ester only.

In this manner a surprising and unexpected reduction in cloud point may often be observed when the biodiesel is blended with, for example, petrodiesel in an amount of at least about 4, preferably at least about 5 to at most about 22, preferably at most about 20 volume percent biodiesel based on the total volume of the blend of biodiesel and petrodiesel. In, for example, blends comprising only biodiesel and petrodiesel, the petrodiesel may range from at least about 78, or at least about 80 up to about 95, or even up to about 96 percent by volume petrodiesel with the remainder being biodiesel and any additives. In other specific embodiments, the inventive biodiesel comprises from about 4 to about 6, from about 8 to about 12, from about 14 to about 16, or from about 18 to about 22 volume percent biodiesel of a blend of petrodiesel and biodiesel based on the total volume of the blend.

EXAMPLES

Preparation of FAIE and FAME from Peanut Oil 2.5 liters of FAIE were prepared by transesterification using isopropanol and store-bought peanut oil. Likewise, 2.5 liters of FAME were produced using methanol and store-bought peanut oil.

Evaluation of FAIE and FAME from Peanut Oil

The glycerin and total acid number of the FAME and FAIE were tested before and after purification by distillation and the data reported in Table 1.

TABLE 1

Purification of FAIE and FAME

| | Total Glycerin, by ASTM 6584 (Free Glycerin and Total Glycerin) | Total Acid Number by ASTM D664 |
|---|---|---|
| FAIE before purification | Free Glycerin: <0.005% Total Glycerin: 5.41% | 3.2 |
| FAIE after purification | Free Glycerin: <0.005% Total Glycerin: 0.03% | <0.1 |
| FAME before purification | Free Glycerin: <0.005% Total Glycerin: 1.96% | [a]0.6 |
| FAME after purification | Free Glycerin: <0.005% Total Glycerin: [b]0.45% | <0.1 |

[a] by H NMR;
[b] FAME sample has ~0.43% tri-oleins, hardly removed from FAME by flash column.

(Specification for B100 Biodiesel Based on ASTM D6751-07b:

| Acid Number | D 664 | 0.50 max. | mg KOH/g |
|---|---|---|---|
| Free Glycerin | D 6584 | 0.020 max. | % mass |
| Total Glycerin | D 6584 | 0.240 max. | % mass) |

Pour and Cloud Points

The purified FAIE and FAME were then evaluated for pour and cloud points neat, and in 5, 10, and 20 volumetric percent blends with Diesel A ("CARB" diesel, D7520) and Diesel B (Federal diesel, D7633). Base fuel inspections are given in Table 2 while cloud and pour point results for the blends are given in Table 3 below. ASTM D5771 was used to determine cloud point while ASTM D97 was used to determine pour point.

TABLE 2

Base Diesel Fuels Used to Prepare Biodiesel Blends

| Properties | | Diesel A | Diesel B |
|---|---|---|---|
| API Gravity, 60° F. | | 38.4 | 33.3 |
| Density, 15° C. | | 0.8324 | 0.8580 |
| Viscosity @40° C., cSt | | 2.771 | 2.811 |
| Sulfur, ppm (UVF) D5453 | | 4.82 | 5.12 |
| Nitrogen, ppm | | <0.1 | 3.11 |
| Flash Point, ° C. | | 64 | 71 |
| Cloud Point, ° C. | | −13 | −14 |
| Pour Point, ° C. | | −18 | −18 |
| CFPP, ° C. | | −12 | −16.5 |
| Karl Fischer Water, ppm | | 21 | 39 |
| Acid No., mg KOH/g | | <0.05 | <0.1 |
| SFC Aromatics, wt % | | 20.8 | 35.7 |
| SFC PNA'S, wt % | | 2.3 | 7.3 |
| Alkyl Nitrate by GC, ppm | | <5 | |
| Cetane Index, ASTM D4737 | | 51.7 | 43.0 |
| Derived Cetane Number by IQT | | 51.5 | 41.6 |
| HFRR WSD, mm | | 324 | 379 |
| Distillation, ASTM D86, ° F. | IBP | 327.3 | 345.2 |
| | 10% | 405.5 | 427.8 |
| | 50% | 532.0 | 517.8 |
| | 90% | 613.4 | 612.5 |
| | 95% | 631.9 | 637.3 |
| | EPT | 658.7 | 665.4 |

TABLE 3

Cloud and Pour Points
FAIE and FAME Blends
Cloud and Pour Point Results

| Sample | | Cloud Point (° C.) | Pour Point (° C.) |
|---|---|---|---|
| California, ULSD Diesel | D7520 | −13 | −17 |
| Federal Diesel | D7633 | −14 | −18 |
| FAIE (B100) | | 10 | 1 |
| FAME (B100) | | 17 | 1 |
| B5 FAIE (CARB) | | −10 | −14 |
| B5 FAME (CARB) | | −10 | −14 |
| B5 FAIE (Fed) | | −11 | −15 |
| B5 FAME (Fed) | | −11 | −16 |
| B10 FAIE (CARB) | | −9 | −16 |
| B10 FAME (CARB) | | −6 | −15 |
| B10 FAIE (Fed) | | −10 | −16 |
| B10 FAME (Fed) | | −6 | −16 |
| B20 FAIE (CARB) | | −5 | −17 |
| B20 FAME (CARB) | | 0 | −12 |
| B20 FAIE (Fed) | | −6 | −20 |
| B20 FAME (Fed) | | 0 | −15 |

Figure 2:
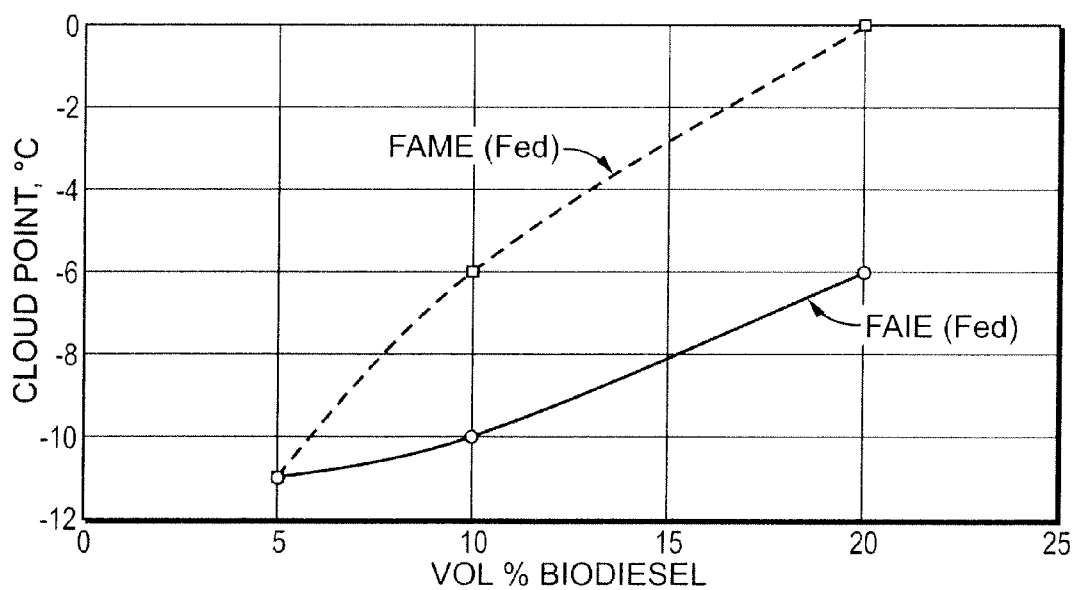
FIG. 2 shows the cloud points of various blends of biodiesel and Diesel B of the examples.

Example of Samples:
B5 FAIE (CARB) = 5% by volume FAIE in California Diesel
B5 FAIE (Fed) = 5% by volume FAIE in Federal Diesel As seen in FIGS. 1-2, for blends with greater than 5 LV % biodiesel, there is a significantly lower cloud point for both Diesel A ("CARB" diesel, D7520) and Diesel B (Federal diesel, D7633) when using FAIE instead of FAME. This reduced the increase in cloud point going from B5 to B10 to only 1° C., versus a jump of 4-5° C. for adding FAME to B10.

Figure 3:
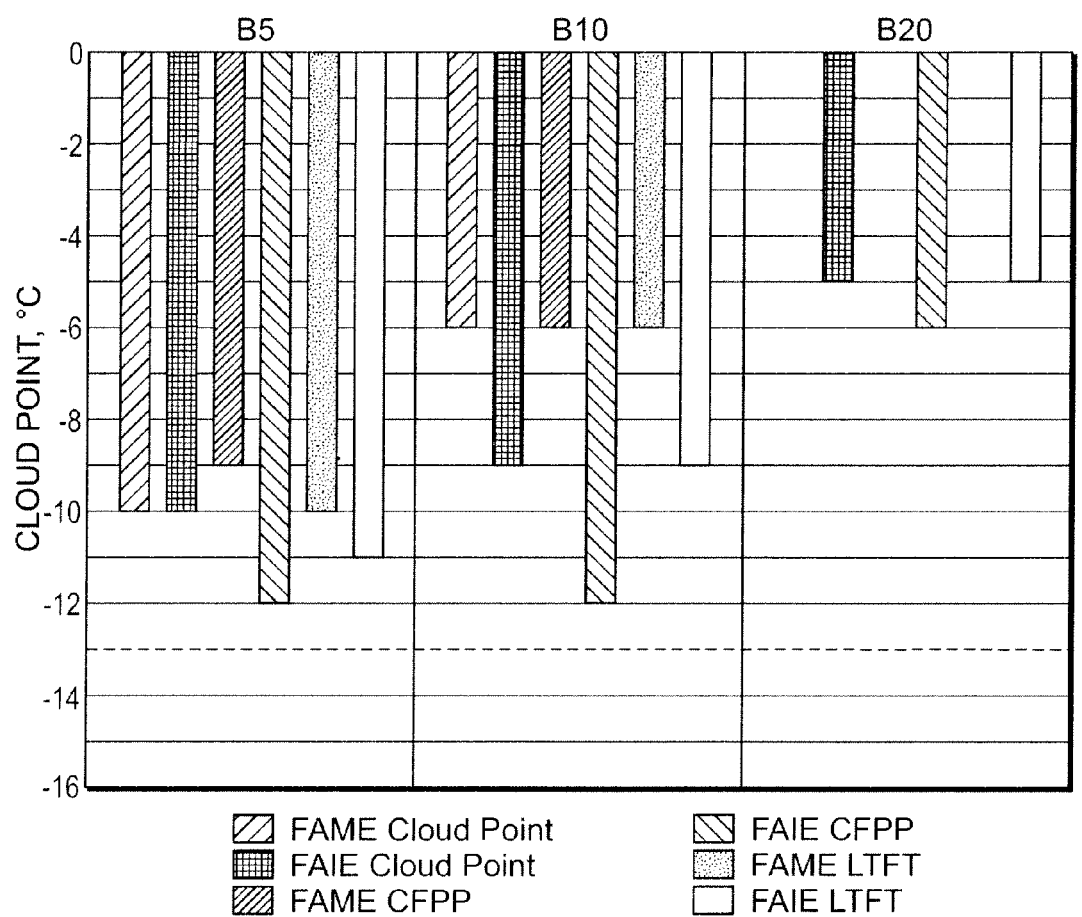
FIG. 3 shows the cold filter plugging point and low temperature flow test results for various blends of biodiesel and Diesel A of the examples.
Figure 4:
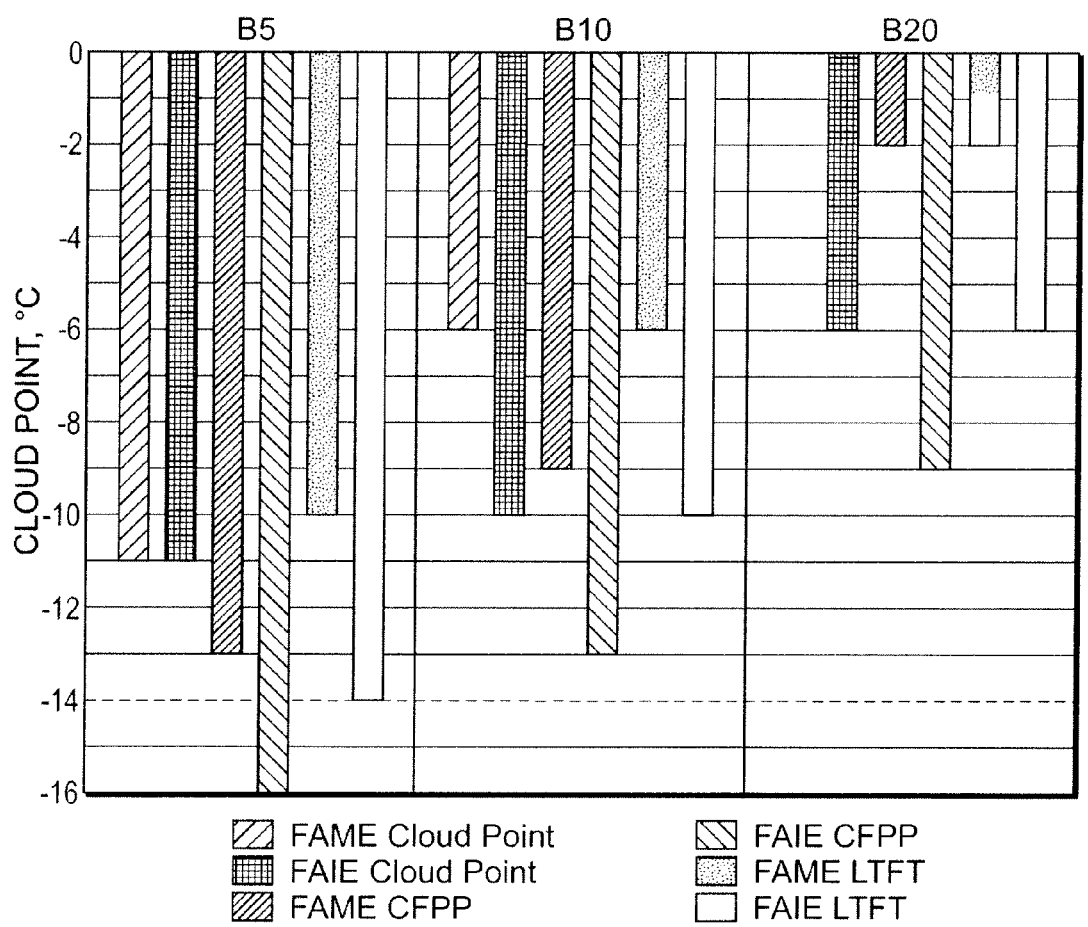
FIG. 4 shows the cold filter plugging point and low temperature flow test results for various blends of biodiesel and Diesel B of the examples.

The Cold Filter Plugging Point was also evaluated using ASTM D6371 and the results are shown in FIGS. 3-4. For blends with FAIE instead of FAME, a reduction of at least about 3° C. was found even for blends with 5 LV % biodiesel. Improvements were also found in the Low Temperature Flow Test using ASTM NEED ASTM TEST D4539.

Figure 5:
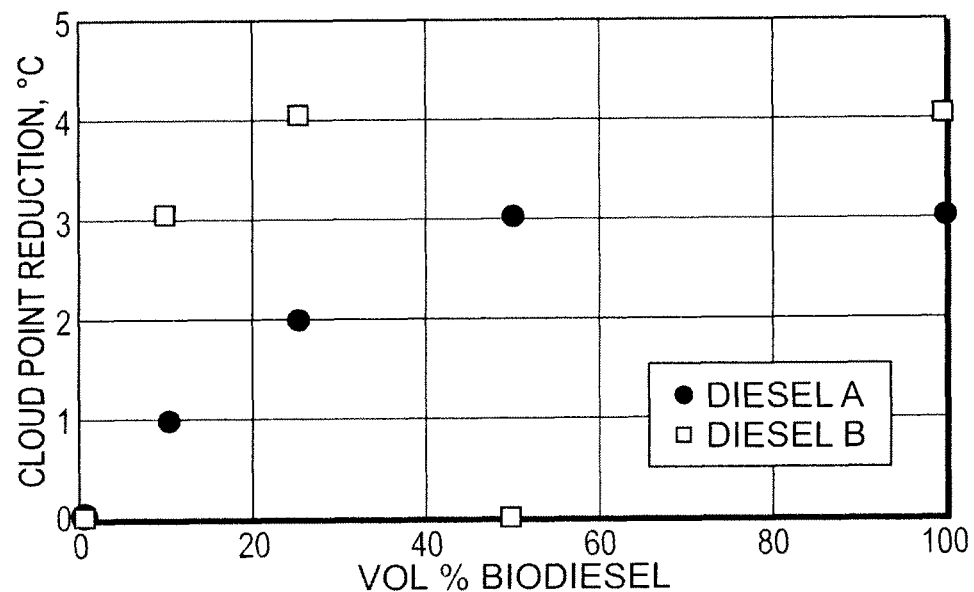
FIG. 5 shows the cloud point reduction for various blends of biodiesel with Diesel A and Diesel B of the examples.

Lastly, B10 biodiesel blends were evaluated for cloud point where the biodiesel was a mixture of FAME and FAIE. Surprisingly, it was found that even when most of the biodiesel was FAME, the FAIE still had a beneficial effect at reducing cloud point. For Diesel B (Federal diesel, D7633), nearly as much cloud point reduction was found when only one-tenth of the biodiesel was FAIE as with all FAIE as shown in FIG. 5. Thus, FAIE can be an effective and cost competitive additive component for biodiesel blending into diesel already near its maximum cloud point limit. FAIE addition could also enable the use of a wider range, and potentially lower cost, of vegetable oil feeds while still meeting cloud point specifications.

Figure 6:
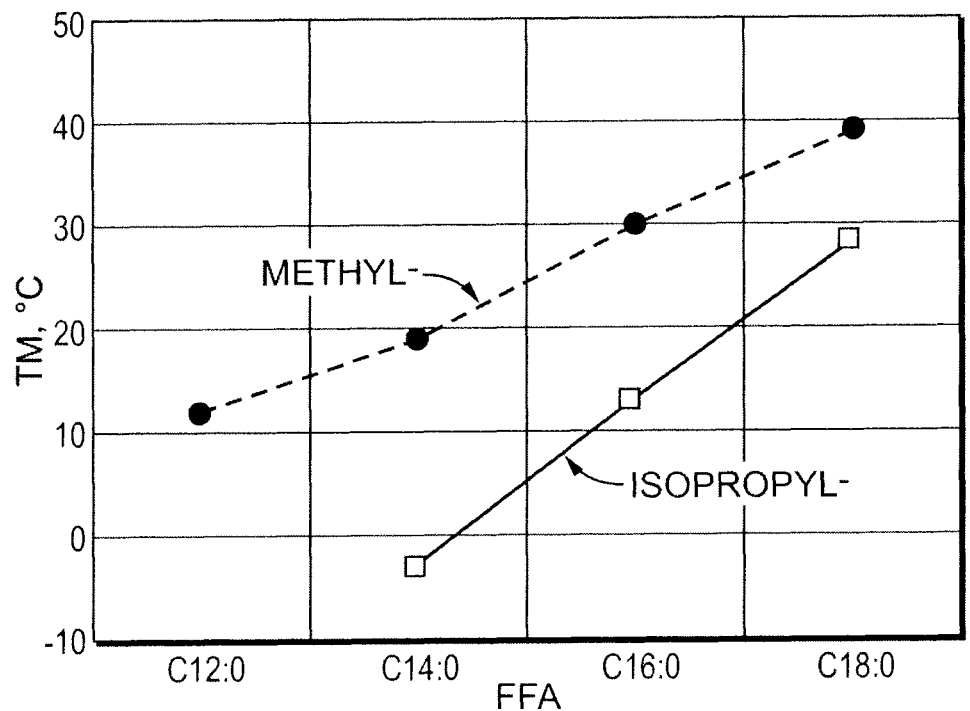
FIG. 6 shows the melting point of saturated fatty acid alkyl esters of various carbon chain lengths.

Based on known melting point data as shown in FIG. 6, the beneficial effect of FAIE versus FAME wshould increase as chain length of the fatty acids decreases. The lower cloud points would then enable at least some saturation of double bonds along the fatty acid chains, improving oxidation and storage stability, currently major drawbacks of conventional biodiesel. Lower fatty acid chain length would also increase the volatility of the biodiesel, reducing contamination of the motor oil in diesel engines. Shorter fatty acids would be found in feeds such as palm oil or bio-engineered algae oil which may be preferable for some compositions.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety to the extent that they are not inconsistent and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A biodiesel composition comprising at least about 50 percent by volume fatty acid methyl ester and from about 10 to about 40 volume percent of fatty acid isopropyl ester based on the total volume of the biodiesel composition as measured in degrees.

2. The composition of claim 1 wherein the fatty acid of the fatty acid methyl ester and the fatty acid of the fatty acid isopropyl ester independently comprise from about 10 to about 18 carbons.

3. The composition of claim 1 wherein the fatty acid of the fatty acid methyl ester and the fatty acid of the fatty acid isopropyl ester independently comprise 16 carbons or less.

4. The composition of claim 1 wherein the fatty acid of the fatty acid methyl ester and the fatty acid of the fatty acid isopropyl ester independently comprise 14 carbons or less.

5. The composition of claim 1 wherein the fatty acid of the fatty acid methyl ester and the fatty acid of the fatty acid isopropyl ester are derived from an oil independently selected from the group consisting of tallow, algae, a vegetable oil and mixtures thereof.

6. The composition of claim 5 wherein the vegetable oil is selected from the group consisting of peanut, palm, soy, rapeseed, mustard, jatropha, mahua, hemp, field pennycress, pongamia pinnata, flax, camellina, sunflower, and mixtures thereof.

7. The composition of claim 1 wherein the cloud point of a blend of 10 percent by liquid volume of the biodiesel composition of claim 1 and 90 percent by liquid volume petrodiesel is at least about 2° C. or less than the cloud point of a comparable blend of 10 percent by liquid volume of a fatty acid methyl ester and 90 percent by liquid volume petrodiesel.

8. The composition of claim 1 wherein the cloud point of a blend of 10 percent by liquid volume of the biodiesel composition of claim 1 and 90 percent by liquid volume petrodiesel is at least about 3° C. or less than the cloud point of a comparable blend of
   10 percent by liquid volume of a fatty acid methyl ester and 90 percent by liquid volume petrodiesel.

9. The composition of claim 1 which further comprises petrodiesel.

10. The composition of claim 9 wherein the biodiesel comprises from about 5 to about 20 percent by volume based on the total volume of the composition.

11. A composition comprising petrodiesel and from about 4 to about 22 volume percent biodiesel based on the total volume of the composition, wherein the biodiesel comprises fatty acid isopropyl ester and fatty acid methyl ester and wherein said fatty acid isopropyl ester comprises from about 10 to about 40 volume percent of the biodiesel based on the total volume of biodiesel.

12. The composition of claim 11 wherein the cloud point of said composition is at least about 2° C. less than a comparable composition having the same volume percent biodiesel which lacks a fatty acid isopropyl ester.

13. The composition of claim 11 wherein the cloud point of said composition is at least about 3° C. less than a comparable composition having the same volume percent biodiesel which lacks a fatty acid isopropyl ester.

14. The composition of claim 11 wherein the amount of biodiesel is from about 8 to about 12 volume percent of the total composition.

15. A composition comprising bodiesel and petrodiesel,
    wherein the petrodiesel comprises at least about 78% by volume based on the total volume of the composition, and
    wherein the biodiesel comprises fatty acid methyl ester and from about 5 to about 40 volume percent of fatty acid isopropyl ester based on the total volume of the biodiesel.

16. The composition of claim 15 wherein the biodiesel comprises fatty acid methyl ester and from about 10 to about 40 volume percent of fatty acid isopropyl ester based on the total volume of the biodiesel.

17. The composition of claim 15 wherein the biodiesel comprises fatty acid methyl ester and from about 20 to about 40 volume percent of fatty acid isopropyl ester based on the total volume of the biodiesel.

* * * * *